3,822,297
3α-HYDROXY-19-NOR-5α-PREGNANE-11,20-DIONE
AND A METHOD FOR ITS PREPARATION
Gordon Hanley Phillipps, Wembley, and Leslie Stephenson, Hanwell, London, England, assignors to Glaxo Laboratories Limited, Greenford, England
No Drawing. Filed Nov. 10, 1972, Ser. No. 305,245
Claims priority, application Great Britain, Nov. 11, 1971, 52,466/71
Int. Cl. C07c 167/00, 169/00
U.S. Cl. 260—397.45                     1 Claim

ABSTRACT OF THE DISCLOSURE

The invention provides a new anaesthetic substance, namely, 3α-hydroxy-19-nor - 5α - pregnane-11,20-dione, and a method for its manufacture whereby (a) 19-nor-5α-pregnane-3,11,20 - trione is reduced, e.g. using an iridium catalyst reduction system or (b) 3α-hydroxy-19-nor-5α-pregnane-16-one-11,20-dione is hydrogenated. The invention also includes pharmaceutical compositions containing the new compound and a method of inducing anaesthesia by administration of the new compound.

---

This invention is concerned with improvements in or relating to steroids having anaesthetic activity, and to pharmaceutical compositions based thereon.

It has long been known that a number of steroids give rise to profound depression of the central nervous system and act pharmacodynamically as anaesthetics or hypnotics. Such compounds have been the subject of considerable study in an attempt to find anaesthetics to replace such substances as thiopentone sodium normally used but well known to be accompanied by some degree of hazard or disadvantage. The literature shows that very many steroid compounds have been studied in this regard. Reviews and discussions of some of the work carried out are to be found, for example, in "Methods in Hormone Research" (edited by Ralph I Dorfman, Vol. III, Part A, Academic Press, London and New York, 1964, pages 415–475); H. Witzel, Z. Vitamin Hormon-Fermentforsch 1959, 10, 46–74; H. Selye, Endocrinology, 1942, 30, 437–453; S. K. Figdor et al.: J. Pharmacol, Exptl. Therap. 1957, 119, 299–309 and Atkinson et al., J. Med. Chem. 1965, 8, 426–432.

A thorough review of the literature indicates that anaesthetic steroids generally possess poor activity and/or long induction periods. With such compounds a variety of undesired side effects such as paraesthesia and vein damage have been noted. Many steroid compounds having anaesthetic action are also of poor solubility and thus much research has hitherto been directed to the introduction of solubilising groups into such steroids, e.g. by the formation of partial esters with di- or polybasic acids. Anaesthetic steroids are generally relatively simple pregnane derivatives often hydroxylated in the 3-position, the general trend having been in the latter case to study 3β-hydroxy compounds rather than 3α-hydroxy compounds.

As a result of prolonged study of numerous steroids exhibiting anaesthetic activity we have found that 3α-hydroxy-19-nor-5α-pregnane-11, 20 dione (hereinafter called "steroid I") has quite remarkable properties as an anaesthetic.

Steroid I is a new compound and constitutes one aspect of the invention.

Steroid I is highly active as an anaesthetic and its anaesthetic properties are comparable to those of its corresponding 10-methyl compound, 3α-hydroxy-5α-pregnane-11,20-dione. Steroid I does however have a surprising advantage as compared to the latter compound in that it does not exhibit toxicity until much higher doses are reached. It some cases, the minimum toxic doses of steroid I has been found to be about four times higher than that of the corresponding 10-methyl compound.

Steroid I may be regarded as a central nervous system depressant, and thus in addition to its use as an anaesthetic it may also, in suitable doses, be used as an hypnotic or sedative.

Steroid I may be formulated as convenient, following generally known pharmaceutical (including veterinary) practices, with the aid of one or more pharmaceutically acceptable carriers or excipients. For anaesthetic purposes the steroid will be given by injection and thus one aspect of the invention comprises anaesthetic compositions for parenteral administration comprising steroid I in a parenterally acceptable vehicle.

Steroid I has poor solubility in water but it can be brought into aqueous solution with the aid of certain non-ionic surface active agents to yield solutions of a sufficient concentration for injection, the resulting solutions when injected showing excellent anaesthetic properties.

Thus the aqueous solutions of steroid I according to the invention induce anaesthesia and possess short induction periods, the anaesthetic action at suitable doses being substantially instantaneous; the solutions are thus excellent anaesthetics for inducing anaesthesia which is to be maintained e.g. by an inhalation anaesthetic such as ether, halothane, nitrous oxide, trichloroethylene etc. The solutions are however capable of maintaining anaesthesia and analgesia to a sufficient degree to enable various surgical operations to be conducted without the aid of an inhalation anaesthetic, the required degree of anaesthesia being maintained if necessary by repeated administration (or even continuous administration). Moreover, the undesired side-effects hitherto associated with steroidal anaesthetics are reduced or eliminated.

The non-ionic surface active agent should, of course, be parenterally acceptable in the quantities injected into the species to be treated (man or animal). The compositions will usually contain at least 1% of the surface active agent.

The non-ionic surface active agents used for the purpose of this invention are generally those of the water soluble type, conveniently having an HLB value of at least 9, preferably at least about 12, advantageously at least about 13. Preferably the HLB value of the surface active agent is not greater than about 15 although it may, for example, be as high as 18. The surface active agent must naturally be one which is physiologically compatible, i.e. of itself gives rise to no physiologically unacceptable side effects in the dosages employed in the intended species to be treated (man or animal). Surface active agents for use in accordance with the invention are for example to be found among the following non-ionic surfactants and classes of surfactants.

Polyoxyethylated derivatives of fatty ($C_{12}$–$C_{20}$) glyceride oils, e.g. castor oil, containing at least 35, e.g. from 35 to 45 or even up to 60 oxyethylene groups per mole of fatty oil. Polyoxyethylene ethers (containing from 10 to 30 oxyethylene groups) of long chain alcohols (containing for example from 12–18 carbon atoms).

Polyoxyethylene-polyoxypropylene ethers containing from 15 to 35, and from 15 to 30, oxyethylene and oxypropylene groups respectively. Polyoxyethylene ethers (containing from 6 to 12 oxyethylene groups) of alkyl phenols the alkyl groups of which preferably contain 6–10 carbon atoms.

Polyoxyethylated (containing from 15 to 30 oxyethylene groups) fatty acid (e.g. $C_{12-18}$) esters of sugar alcohol anhydrides e.g. sorbitan or mannitan. Long-chain (e.g. $C_{10-16}$) alkanoyl mono- and di-alkanol-amides (the alkanol portions of which for example contain 1–5 C atoms) for example lauroyl mono- and di-ethanolamides. Polyethylene glycol esters (containing from 6 to 40 ethylene oxide units) of long chain fatty acids (containing for example 12–18 C atoms) e.g. polyethyleneglycol mono-oleate (containing for example 8 ethylene oxide units).

Examples of non-ionic surface active agents, of the foregoing types, useful in accordance with the invention include:

Cremophor EL, a polyoxyethylated castor oil containing about 40 ethylene oxide units per triglyceride unit;

Tween 80, polyoxyethylene sorbitan monooleate containing about 20 ethylene oxide units;

Tween 60, polyoxyethylene sorbitan monostearate containing about 20 ethylene oxide units; and Tween 40, polyoxyethylene sorbitan monopalmitate containing about 20 ethylene oxide units.

The expression "solutions" is used herein to denote liquids which have the appearance of true solutions and are thus optically clear and capable of passage, for example, through a micro-porous filter, irrespective of whether such solutions are true solutions in the classical chemical sense and irrespective of whether they are stable or metastable. Thus it may be that the steroid is associated with micelles. The solutions of this invention, irrespective of their precise physical nature, behave as true solutions for the practical purpose of intravenous injection.

The proportion of surface active agent to be used in the compositions of this invention depends upon its nature and upon the concentration of steroid desired in the final composition.

In preferred compositions according to the invention the proportion of surfactant is preferably at least 5% by weight and advantageously above 10% by weight. A very convenient proportion of surfactant has been found to be 20% by weight but 30% and up to 50% may be used. The proportions of surfactant are expressed by weight in relation to the total volume of the composition in metric units.

The composition will contain at least 1 mg./ml. of steroid I and solutions can be made containing for example up to 10 mg./ml., e.g. about 5 or 7 mg./ml. (in 20% Cremopher El).

In all cases, the relative proportion of the various components are preferably adjusted to give a clear solution. Other physiologically acceptable substances may also be included in the compositions, for example substances such as sodium chloride, dextrose or glycerol which serve to make the solution substantially isotonic with blood.

The anaesthetic solutions according to the invention are generally administered by intravenous injection although as is known in the anaesthetic art in certain cases, e.g. with young children, intramuscular injection might be preferred.

As is usual in the case of anaesthetics, the quantity of steroid I used to induce anaesthesia depends upon the weight of the individual to be anaesthetised. For intravenous administration in the average man a dose of from 0.45 to 3.5 mg./kg. will in general be found to be satisfactory to induce anaesthesia, the preferred dose being within the range of from 0.7 to 2.5 mg./kg. Generally a dose of 0.75–1.0 mg./kg. is very satisfactory. The dose will naturally vary to some extent dependent upon the physical condition of the patient, and the degree and period of anaesthesia required, all as is well known in the art. It is thus possible by adjustment of the dose to achieve durations of anaesthesia varying from about 10 minutes to up to an hour or more. If it is desired to maintain prolonged anaesthesia, repeated doses of solutions of this invention may be used, such repeated doses being generally either of the same order or lower than the original dose. Alternatively continuous administration may be undertaken at for example a rate of 0.025–0.075 mg./kg./min.

Where the anaesthetic solutions are administered intramuscularly, higher doses are generally necessary.

Steroid I can be prepared by a number of different conventional techniques, but the preferred method is the reduction of the corresponding 3-ketone, 19-nor-5α-pregnane-3,11,20-trione, with for example an iridium catalyst reduction system. This technique selectively and stereospecifically reduces the 3-oxo group to the required 3α-hydroxy group, in high yield.

Good results are obtained by using an iridium catalyst reduction system prepared by refluxing a mixture of chloroiridic acid, trimethylphosphite and aqueous isopropanol, the mixture being neutralised using an organic base such as triethylamine. The reduction is carried out by refluxing the trione with the neutralised mixture as described in British Patent Application No. 52,465/71.

Other iridium acids or salts, other trivalent phosphorus compounds and other alcohols may be used to prepare the reduction system, and the base and the quantity of it added may also be varied.

Another method of performing this reduction is that described by Browne and Kirk (*J. Chem. Soc.* C, 1969, 1953).

The trione used in the reduction may itself be prepared from available compounds by a variety of methods.

Thus for example, it may be prepared from the known 11α,17α-dihydroxy-19-nor-pregn-4-ene - 3,20 - dione. The first step in the preparation is the dehydration of the latter compound to give 11α-hydroxy-19-norpregna-4,16-diene-3,20-dione by, for example, formation of a semicarbazone which is then decomposed with acid. This product is then reduced, for example, with lithium-ammonia, to give (on account of partial reduction of the carbonyl groups) a complex mixture of 3,11,20-oxygenated steroids of the 5α-series. Oxidation of this reaction product (e.g. with Jones reagent or acidic dichromate) gives the required trione.

As an alternative procedure, 3α-hydroxy-19-nor-5α-pregn-16-ene-11,20-dione, which may be obtained from 19-nor-5α-pregn-16-ene-3,11,20-trione by the chloroiridic acid reduction method described above, may be hydrogenated, e.g. catalytically 19 - nor - 5α - pregn-16-ene-3,11,20-trione can be obtained from 11α,17α-dihydroxy-19-nor-pregn-4-ene-3,20-dione by hydrogenation to yield 11α,17α-dihydroxy-19-nor-5α-pregna - 3,20 - dione which can be dehydrated, e.g. by semicarbazone formation followed by acid decomposition, to give 11α-hydroxy-19-nor-5α-pregn-16-ene-3,20-dione which can than be oxidised, e.g. with Jones reagent to give the required trione.

In addition to its utility as an anaesthetic, steroid I is a useful intermediate in the preparation of other members of the 5α-pregnane series of steroids and of members of the 5α-androstane series.

For example, 2β-substituted-5α-pregnanes may be prepared from Steroid I by way of corresponding 2α,3α-epoxy compound as described in Belgian Pat. No. 757,239.

Many androstane derivatives may be found, for example, by first oxidising the 17β-acetyl group of steroid I (e.g. with a hypohalite salt) to form a 17β-carboxy group. This carboxy group may then be esterified by conventional methods to give a wide variety of esters.

The following Examples illustrate the invention. In both the Example and the Preparations, temperatures are in ° C.

EXAMPLE 1

3α-Hydroxy-19-nor-5α-pregnane-11,20-dione

A solution of 19-nor-5α-pregnane-3,11,20-trione (0.9 g., 0.28 mmole.) in "stock" chloridic solution (75 ml.) was refluxed for 24 hr. The solution was then cooled, partitioned between water and ether and the organic layer was washed well with water, dried ($Na_2SO_4$) and evaporated. The residue was subjected to preparative t.l.c. (Silica, EtOH x 1) and recrystallised from acetone to afford *3α-hydroxy-19-nor-5 -pregnane-11,20 dione* (0.6 g.; 67%) as white needles, m.p. 154°, [α]$_D$ +200° (c 1.0 CHCl$_3$).

EXAMPLE 2

0.05 g. of 3α-hydroxy-19-nor-5α-pregnane-11,20-dione were dissolved in 2 ml. of acetone at 20°. The resultant solution was added to 2 g. of Cremophor El at 20° and it was stirred until homogeneous. The acetone was removed by a vigorous stream of nitrogen. The solution was diluted with sterile distilled water containing 0.025 g. of sodium chloride to give a final volume of 10 ml.

Preparations.—Jones reagent refers to a solution of chromium trioxide (267 g.) in a mixture of concentrated sulphuric acid (230 ml.) and water (400 ml.) made up to 1 litre with water (8N w.r.t. oxygen). "Stock" chloroiridic solution was prepared by refluxing a mixture of chloroiridic acid (0.09 g.) 90% isopropyl alcohol (200 ml.) and trimethyl phosphite (16 ml.) for 16 hr. The solution was neutralised with triethylamine immediately prior to use.

11α-Hydroxy-19-norpregna-4,16-diene-3,20-dione

A solution of a mixture of 11α,17α-dihydroxy-19-norpregn-4-ene-3,20-dione (4 g., 1.2 mmole.) and semicarbazide hydrochloride (4 g.) in methanol (200 ml.) was refluxed for 2 hr. The methanol was then removed by distillation under reduced pressure and water was added to the residue. The precipitated solid was collected by filtration, washed with water and dried over P$_2$O$_5$ in vacuo. A solution of this solid in a mixture of glacial acetic acid (80 ml.), water (28 ml.) and pyruvic acid (4 ml.) was heated on a steam bath for 1 hr. The resulting solution was concentrated under reduced pressure and partitioned between saturated aqueous sodium bicarbonate and ethyl acetate. The organic layer was washed with water, dried (Na$_2$SO$_4$) and evaporated to dryness. The residue was subjected to preparative t.l.c. (Silica/ CHCl$_3$, (CH$_3$)$_2$ CO; 15:1, x 1) and crystallised from acetone/petroleum ether (60–80°) to afford 11α-hydroxy-19-norpregna-4,16-diene-3,20-dione (1.6 g. 42%) as white needles, m.p. 149°. *19-nor-5α-pregna-3,11,20-trione via 3ξ,11α,20ξ-trihydroxy-19-nor-5α-pregnane.*

A solution of 11α-hydroxy-19-norpregna-4,16-diene-3, 20-dione (2.5 g., 0.8 mmole.) in dry detrahydrofuran (200 ml.) was added over 5 mins. to a solution of lithium (5 g.) in liquid ammonia (2.5 litres). The solution was then left for 30 min. Ethanol (ca. 100 ml.) was then added until the blue colour had been discharged and the ammonia was then allowed to evaporate. The residue was partitioned between water and ether. The organic layer was washed, dried (Na$_2$SO$_4$) and evaporated to give crude 3ξ,11α,20ξ-trihydroxy-19-nor-5α-pregnane (1.5 g.). The crude trihydroxy compound was oxidised in two ways.

(a) Acidic potassium dichromate

A solution of crude 3ξ,11α,20ξ-trihydroxy-19-nor-5α-pregnane (4 g.) in acetone (280 ml.) was treated with a solution of potassium dichromate (8.0 g.) in 2N-sulphuric acid (38 ml.) at room temperature for 1 hour. An additional quantity of potassium dichromate (8 g.) in 2N-sulphuric acid (38 ml.) was then added and left at room temperature for 15 mins. The solution was then partitioned between water and ether and the organic layer was washed with water, dried (Na$_2$SO$_4$) and evaporated. The residual oil was subjected to preparative t.l.c. (Silica, CHCl$_3$, x 2) and recrystallised from acetone/ petroleum ether (60–80°) to afford *19-nor-5α-pregnane-3,11,20-trione*, (1.04 g., 25%) as white prisms m.p., 151°, [α]$_D$ +240° (c 1.0 CHCl$_3$).

(b) Jones reagent

A solution of crude 3ξ,11α,20ξ-trihydroxy-19-nor-5α-pregnane (1.5 g.) in acetone (40 ml.) was treated dropwise with Jones reagent (5 ml.) at room temperature. The resulting solution was partitioned between water and ethyl acetate. The organic layer was washed with water, dried (Na$_2$SO$_4$) and evaporated. The residue was subjected to preparative t.l.c. (Silica CHCl$_3$, x 2) and recrystallised from acetone/petroleum ether (60–80°) to afford 19-nor-5α-pregnane-3,11,20-trione (44 g., 30%) identical with the sample prepared by the alternative procedure (a).

What we claim is:

1. 3α-Hydroxy-19-nor-5α-pregnane-11,20-dione.

References Cited

UNITED STATES PATENTS

| 3,169,132 | 2/1965 | Birkenmeyer et al. | 260—397.3 |
| 3,350,427 | 10/1967 | Gebert et al. | 260—397.4 |

OTHER REFERENCES

Rodds—Chemistry of Carbon Compounds, 2nd Ed., 1970, pp. 38, 39 and 392.

HENRY A. FRENCH, Primary Examiner

U.S. Cl. X.R.

260—397.3; 424—243